United States Patent
Gordon

(10) Patent No.: US 8,151,139 B1
(45) Date of Patent: Apr. 3, 2012

(54) PREVENTING DATA LOSS FROM RESTORE OVERWRITES

(75) Inventor: Paul T. Gordon, Orlando, FL (US)

(73) Assignee: Symantec Corporation, Mountain View, CA (US)

( * ) Notice: Subject to any disclaimer, the term of this patent is extended or adjusted under 35 U.S.C. 154(b) by 170 days.

(21) Appl. No.: 12/412,895

(22) Filed: Mar. 27, 2009

(51) Int. Cl.
*G06F 11/00* (2006.01)

(52) U.S. Cl. .......................................... 714/15; 714/6.3

(58) Field of Classification Search .................. None
See application file for complete search history.

(56) References Cited

U.S. PATENT DOCUMENTS

| | | | |
|---|---|---|---|
| 6,785,789 B1 | 8/2004 | Kekre et al. | 711/162 |
| 6,938,135 B1 | 8/2005 | Kekre et al. | 711/162 |
| 6,978,354 B1 | 12/2005 | Kekre et al. | 711/162 |
| 7,093,090 B1 | 8/2006 | Kekre et al. | 711/162 |
| 7,120,823 B2 * | 10/2006 | Foster et al. | 714/6 |
| 7,293,149 B2 | 11/2007 | Lo | 711/167 |
| 7,310,714 B2 | 12/2007 | Kekre et al. | 711/162 |
| 7,401,255 B1 * | 7/2008 | Stringham | 714/13 |
| 7,594,157 B2 * | 9/2009 | Choi et al. | 714/764 |
| 7,831,564 B1 * | 11/2010 | Wei et al. | 707/649 |
| 2004/0193948 A1 * | 9/2004 | Ono | 714/6 |
| 2006/0020828 A1 * | 1/2006 | Aihara et al. | 713/193 |
| 2006/0066890 A1 * | 3/2006 | Tanida | 358/1.15 |

OTHER PUBLICATIONS

Data Sheet: Backup and Recovery, Symantec Backup Exec™ 12.5 for Windows® Servers, Aug. 2008, Symantec Corporation, pp. 1-7.
Data Sheet: Backup and Recovery, Symantec Backup Exec™ System Recovery, Aug. 2008, Symantec Corporation, pp. 1-6.
Data Sheet: Archiving, Symantec Enterprise Vault™, Sep. 2008, Symantec Corporation, pp. 1-6.
CA ARCserve® Backup, Data Loss Prevention—CA, Copyright © 2009 CA, 1 page.
CA Recovery Management, Copyright © 2009, pp. 1-2.
PrivacyRoot.com Windows Software, Prevent Restore 1.8, available via the Internet at http://privacyroot.com/_free/prevent-restore.php, Jan. 21, 2009, pp. 1-2.
Sun Storage Tek Enterprise Backup Software, Protecting Your Data From Department to Datacenter, available via the Internet at http://www.sun.com/storagetek/management_software/data_protection/enterprise_backup_software, Sun Microsystems, Inc., Copyright 1994-2009, pp. 1-3.

* cited by examiner

*Primary Examiner* — Christopher McCarthy
(74) *Attorney, Agent, or Firm* — Campbell Stephenson LLP

(57) ABSTRACT

Various methods and systems are presented to restore a logical data object from a backup to a working copy, in a manner that allows for the return of the working copy to a prior state of the working copy. One such method and system copies data to a restore backup of a working copy, by copying (sequentially, or in parallel) portions of a version of the logical data object from the working copy to the restore backup.

20 Claims, 8 Drawing Sheets

PREVENTING DATA LOSS FROM RESTORE OVERWRITES

FIELD OF THE INVENTION

This invention relates to data backup systems and, more particularly, to restoring a logical data object from a backup to a working copy.

BACKGROUND OF THE INVENTION

A large problem in data protection is maintaining and organizing backup data from many different sources, including file systems, databases, and server farms. Backup data is often organized using a catalog of the contents of the media on which the backup data is stored. While administrators can gain access to the list of items in the catalog, administrators often cannot gain access to the actual contents of the backup data without first restoring that data. Unfortunately, the process of restoring the data often results in overwriting at least some of the data of a current working copy, resulting in a loss of that data. The current solution to this problem of data loss requires an administrator to create an additional backup of the current working copy before restoring the backup data. Since the current working copy and the backup can easily contain millions of items and terabytes of data, it is often impractical for the administrator to hand select the data to write to the additional backup. Thus, administrators are typically obliged to write the entire working copy to the additional backup, which is not only resource-intensive but time-intensive as well.

The time and resources required to write the entire working copy to an additional backup are especially problematic when the current working copy serves vital operations of a business or governmental organization. In such cases, the newly restored data may not meet current version requirements or may result in an unsatisfactory reduction of data security, forcing the data processing systems of these organizations to cease operation, not only for the length of time required to perform the backup and restore, but also for the length of time required to return, or rollback, the working copy to the working copy's state prior to the restore operation.

Thus, a solution that introduces a comparatively small effect on system performance and data storage reserves, while simultaneously providing for the return of the working copy to the working copy's state prior to the restore operation, is desired. Such a solution will prevent the loss of data stored in the current working copy.

SUMMARY OF THE INVENTION

Various embodiments of methods and systems for restoring a first version of a logical data object from a backup to a working copy and for automatically creating restore backups are disclosed herein. In one embodiment, a method involves receiving a request to restore a first version of a logical data object from a backup to a working copy. In response to the request, a portion of data is copied from the working copy to a restore backup, based on an indication that the portion of data is not identical to a corresponding portion of the first version. Embodiments also involve restoring the portion of the first version to the working copy from the backup, adding a new entry associated with a copy of the data to a catalog, returning the working copy to a prior state of the working copy, accessing information identifying a retention policy for restore backups, and/or deleting the restore backup in response to the retention policy.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and the invention's numerous objects, features and advantages made apparent to those skilled in the art, by referencing the accompanying drawings, in which like reference numbers indicate like features.

Figure 1:
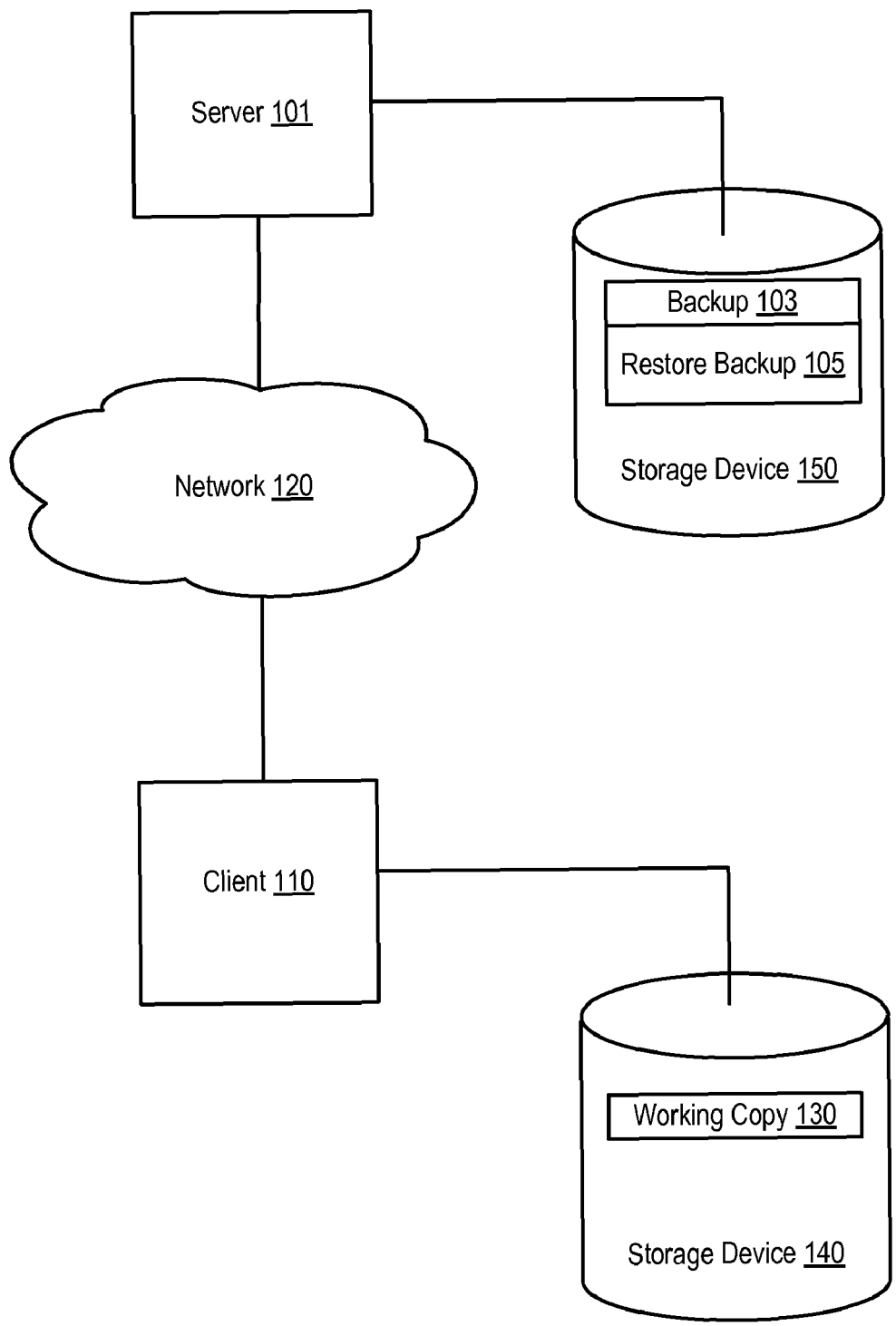
FIG. 1 is a block diagram of a system that supports the restoration of a backup to a working copy, the creation of a restore backup, and the return of the working copy to a prior state of the working copy, according to an embodiment.

While the invention is susceptible to various modifications and alternative forms, specific embodiments of the invention are provided as examples in the drawings and detailed description. It should be understood that the drawings and detailed descriptions are not intended to limit the invention to the particular form disclosed. Instead, the intention is to cover all modifications, equivalents and alternatives falling within the spirit and scope of the invention as defined by the appended claims. While references to one embodiment, or an embodiment appear in the detailed description given below, and in the above text, these references are not necessarily to the same embodiment, but are intended to describe features of the invention that can be incorporated into a variety of embodiments.

DETAILED DESCRIPTION

Gaining access to the data in a particular version of a logical data object stored in a backup often requires restoring the version. In turn, restoring the version often involves copying the version to a working copy, which overwrites (and destroys) data stored in the working copy. The destroyed data will often include another more recent version of the logical data object.

Various embodiments of methods and systems of creating a restore backup of the data stored in the working copy prior to performing a destructive restore operation are disclosed herein. The restore backup can store the differences between the version of the logical data object stored in the backup and the data stored in the working copy. Such a restore backup can reduce the amount of storage space required to protect the data stored in the working copy that is overwritten by the restore. Use of a restore backup may also reduce the amount of time required to perform the restoration and/or the amount of time required subsequent to the restoration to return the working copy to a prior state of the working copy.

The restore backups can be managed (e.g., as part of the backup system's catalog). In one embodiment, an entry associated with data contained in a restore backup is added to a catalog associated with the backup from which data is being restored. Alternatively, an entry associated with the data contained in the restore backup can be added to a new or different catalog than the backup. A retention policy for restore backups can also be instituted in some embodiments.

As used herein, a logical data object is any collection of data that is treated as a singular collection of data. Examples of logical data objects are files, directories of files, logically related blocks of data located within one or more files (such as blocks in the same data stream), databases, and components of databases (e.g., tablespaces). A logical data object can contain as little data as a single bit or as much as, or more than, hundreds of terabytes of data.

Further, as used herein, a version of a logical data object is any collection of data that is treated as that logical data object at a particular point in time. For example, a copy of a logical data object is a version of that logical data object. Further, a modified version of a logical data object is a version of that logical data object. Different versions of a logical data object can be created over time as modifications are made to respective copies of the logical data object and to preexisting versions of the logical data object.

As an example, a user can save a file named Doc1 at time T1. At time T2, the user can save a copy of Doc1 named Doc 2. At time T3, the user can rename Doc1 to GroceryList. At time T4, the user can modify the contents of the file named GroceryList. Thus, after time T4, at least four versions of this file exist: Doc1, Doc2, GroceryList (at T3), and GroceryList (at T4).

FIG. 1 illustrates an example of a system. Client 110 is shown coupled to Server 101 via Network 120. Storage Device 150 is coupled to Server 101, and Storage Device 140 is coupled to Client 110. Backup 103 and Restore Backup 105 are stored on Storage Device 105, while Working Copy 130 is stored on Storage Device 140.

A working copy, such as Working Copy 130, is a copy or version of a logical data object that is not an archived version of the logical data object. A backup, such as Backup 103, is a copy or version of a logical data object that is an archived copy or version of the logical data object. For example, a copy of an electronic document that a user is currently editing, or that a user causes to be written to a computer hard-drive for easy access, is a working copy of that electronic document. Likewise, a copy of the same electronic document that the user places on a tape drive that is stored for possible later access is a backup of the document. In some embodiments, a working copy can be accessed by a user or application directly without use of a backup application. In contrast, backups in such embodiments can only be accessed via a backup application.

Server 101 is configured to copy a version of Working Copy 130 to Backup 103, restore logical data objects contained in Backup 103 to Working Copy 130, create Restore Backup 150, and return Working Copy 130 to a prior state of Working Copy 130, as described in more detail below.

Client 110 and Server 101 can be any kind of computing device. For example, Client 110 and Server 101 can be personal computers, such as laptops, desktops, workstations, or personal data assistants. Alternatively, Client 110 and Server 101 can be servers, or large enterprise mainframe computers, or supercomputers, or groups of computers, such as a server farm. As another alternative, Client 110 and Server 101 can be virtual machines implemented on one or more other physical computers.

While FIG. 1 shows Client 110 and Server 101 coupled via a network, Client 110 and Server 101 can alternatively be directly coupled without intervening network 120. The functionality of Client 110 and Server 101 can be combined in a single computing device, such as Server 101 or Client 110. In addition, the system can contain only a single storage device configured to store each of the Backup 103, the Restore Backup 105, and the Working Copy 130.

Further, the storage devices, such as Storage Devices 140 and 150, can be virtual storage devices (e.g. volumes) residing on any number of physical storage devices. Network 120 can include any of many different kinds of networks. For example, Network 120 can include a WAN (Wide Area Network), one or more LANs (Local Area Networks), and/or one or more SANs (Storage Area Networks), or a combination of such networks.

A backup server, such as Server 101, can receive a request to restore a version of a logical data object from a backup, such as Backup 103, to a working copy, such as Working Copy 130. After such a request is received the backup server creates a restore backup, such as Restore Backup 105, of data stored in a working copy. As will be discussed below, data can be copied to the restore backup before the process of restoration, concurrently with the process of restoration, or after the process of restoration.

The Working Copy, Backup, and Restore Copy

Figure 2:
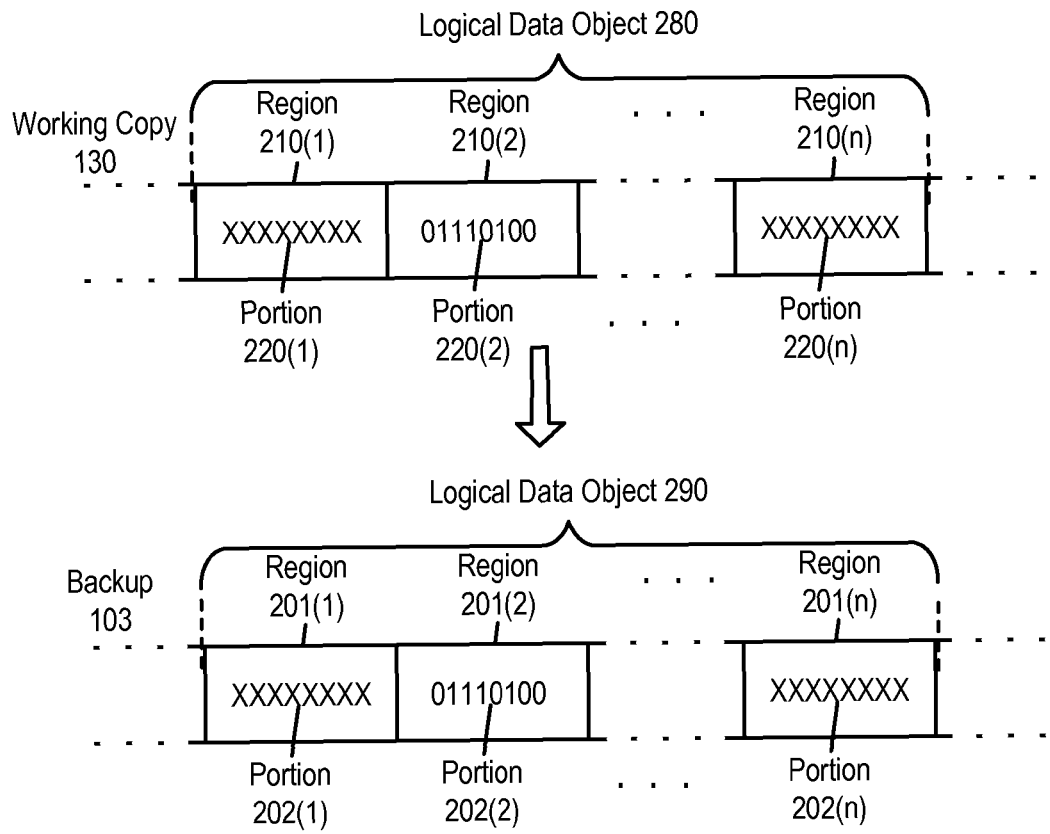
FIG. 2 is a block diagram illustrating the portions of data of a working copy, the portions of data of a backup of the working copy, and the storage regions containing those portions, immediately after the creation of the backup, according to one embodiment.

FIG. 2 illustrates portions of data of Working Copy 130, portions of data of Backup 103, and the storage regions containing those portions, immediately after the creation of Backup 103, according to one embodiment. As noted above, Backup 103 is a backup copy of Working Copy 103.

Storage regions are regions of either a physical storage device or a virtual storage device that are capable of storing accessible data. Examples include the sectors, cylinders, or tracks of a hard-drive, logical block addresses in a volume, as well as the addressable blocks of computer memory.

The Regions 210(1)-210(n) of a storage device containing Working Copy 130 are shown as respectively storing Portions

220(1)-220(n) of Logical Data Object 280. Thus, Region 210(1) Stores Portion 220(1), Region 210(2) Stores Portion 220(2), and so on. Likewise, the Regions 201(1)-201(n) of a storage device containing Backup 103 are shown as respectively storing Portions 202(1)-202(n) of Logical Data Object 290. Portion 220(2) of Logical Data Object 280 and portion 202(2) of Logical Data Object 290 are explicitly shown as containing identical data to illustrate that immediately after the creation of Backup 103 (prior to any modification of Working Copy 130), the data contained in Backup 103 is identical to the data contained in Working Copy 130. Since Logical Data Object 280 and Logical Data Object 290 contain copies of the same data, Logical Data Object 280 and Logical Data Object 290 are identical versions of the same logical data object.

Portions 220(1), 220(n), 202(1), and 202(n) are illustrated with a series of X's. As used in the figures contained herein, a series of X's indicates the presence of data without explicitly identifying any exemplary content of that data. Further, Portions 210(1)-210(n) and 202(1)-202(n) are illustrated as each containing eight bits of data. However, logical data objects can be divided into portions containing any number of bits, including a single bit. Thus, the use of eight bits in the figures contained herein to exemplify the data contained in portions of logical data objects is merely illustrative. In addition, Regions 210(1)-210(n) and 201(a)-201(n) are shown as being located contiguously on their respective storage devices. However, the regions of storage devices storing working copies and backups need not be located contiguously. Thus, the use of contiguous storage regions in the figures contained herein is merely illustrative.

Further, the variable "n" in the figures should not be construed as identifying or standing for a particular number. Therefore, two series of "n" items do not necessarily contain the same number of items. The variable "n" is a placeholder standing for the last item in a series of items. Thus, the fact that Regions 210(1)-210(n) containing Logical Data Object 280 and Regions 201(1)-201(n) containing Logical Data Object 290 are explicitly shown in FIG. 2, does not by itself imply that Logical Data Object 280 and Logical Data Object 290 are contained by the same number of regions, for example. In some situations (like the one illustrated in FIG. 2 where they store identical data), Logical Data Object 280 and Logical Data Object 290 are contained by the same number of regions. In other situations, Logical Data Object 280 and Logical Data Object 290 may be contained by a different number of regions (e.g., if they are non-identical versions). Likewise, Logical Data Object 280 and Logical Data Object 290 can be divided into the same number of portions in some situations, whereas in other situations, Logical Data Object 280 and Logical Data Object 290 can be divided into a different number of portions.

Figure 3:
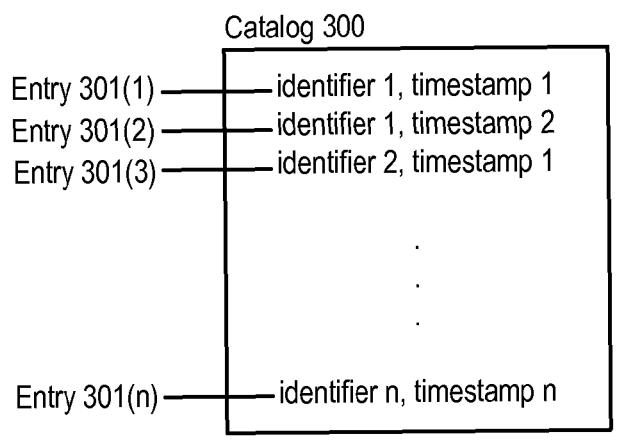
FIG. 3 is a block diagram illustrating a catalog of the contents of a backup, according to one embodiment.

FIG. 3 is a block diagram illustrating a catalog of the contents of one or more backups or other collections of data, such as Backup 103 of FIGS. 1 and 2. FIG. 3 explicitly shows Entries 301(1), 301(2), 301(3), and 301(n) of Catalog 300. Each of these entries is shown having an identifier and a metadata timestamp. Entries 301(1) and 301(2) are shown as both having identifier 1. However, Entry 301(1) has timestamp 1 while Entry 301(2) has timestamp 2. In addition, Entry 301(3) is shown having identifier 2 and timestamp 1. Entry 301(n) is shown having identifier n and timestamp n.

Either during or after the creation of a backup, such as the creation of Backup 103 of FIGS. 1 and 2 by Server 101 of FIG. 1, a catalog, such as Catalog 300, is created, by Server 101 of FIG. 1, for example. The entries in the catalog, such as Entries 301(1)-301(n) of Catalog 300, are each associated with logical data objects contained within the backup, such as Logical Data Object 290 of FIG. 2. Each entry includes an identifier to identify the logical data object associated with the entry, as well as metadata associated with the logical data object. The metadata can include a timestamp, as shown in Catalog 300, indicating when the logical data object was created or placed into the backup.

Entries in the catalog can distinguish between versions of logical data objects by associating the same or similar identifiers with different metadata, as shown in Entries 301(1) and 301(2) of Catalog 300. This allows a catalog to contain entries associated with different versions of logical data objects. These different versions can be contained in either the same or different backups. A catalog can store information related to multiple backups. For example, a catalog may contain an entry for an electronic document titled Doc1, dated May 11, and stored in a backup titled backup1 and also contain an entry for the same electronic document also titled Doc1, but dated June 14, and stored in a backup titled backup2.

Different entries of the catalog that are associated with different logical data objects can contain identical metadata. For example entries 301(1) and 301(3) each contain the same timestamp. This can indicate that these entries correspond to logical data objects that are contained in the same backup.

Figure 4:
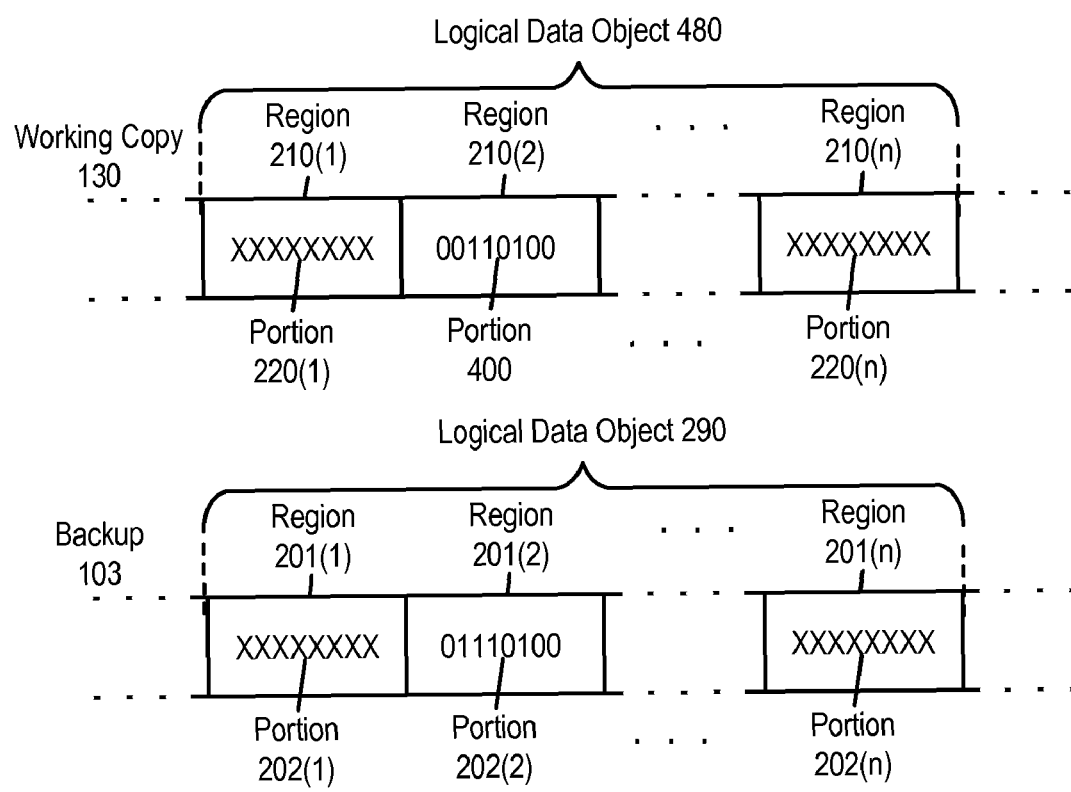
FIG. 4 is a block diagram illustrating the portions of data of a working copy, the portions of data of a backup of the working copy, and the storage regions containing those portions, after the creation of the backup and after a region of the working copy has been modified, according to one embodiment.

FIG. 4 illustrates a working copy of data and a backup subsequent to the creation of the backup, and after new data has been written to the working copy. FIG. 4 shows portions of data of Working Copy 130, portions of data of Backup 103, and the storage regions containing those portions after new data has been written to Region 210(2) of Working Copy 130. FIG. 4 illustrates that the writing of the new data destroys Logical Data Object 280 of FIG. 2 contained in Working Copy 130 of FIG. 2 by overwriting Portion 220(2) of FIG. 2 contained in region 210(2) of FIG. 2 with Portion 400. Overwriting the content of region 210(2) of FIG. 2 effectively creates a new version of Logical Data Object 280 (as shown in FIG. 2), which is labeled as Logical Data Object 480. Thus, Logical Data Object 280 has been transformed into Logical Data Object 480.

While FIG. 4 shows only a single region, Region 210(2), of Working Copy 130 to which new data has been written, new data can be written to any combination of the regions contained in a working copy. In addition, while FIG. 4 illustrates the writing of a single bit to Region 210(2), any number of one or more bits can be written to any number of portions of a working copy contained in any number of regions.

As with Logical Data Object 280 of FIG. 2, Logical Data Object 290 and Logical Data Object 480 are versions of the same logical data object. Logical Data Object 480 was created by modifying and transforming Logical Data Object 280. Thus, while Logical Data Object 280 and Logical Data Object 290 are identical versions (as shown in FIG. 2), Logical Data Object 480 and Logical Data Object 290 are different versions of that logical data object.

Figure 5:
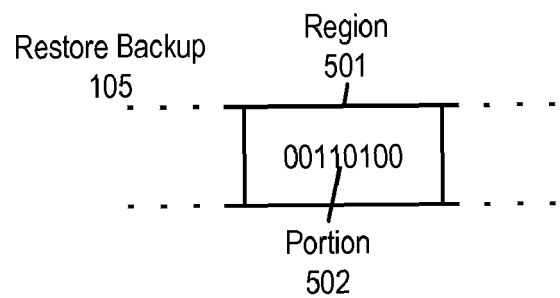
FIG. 5 is a block diagram illustrating the portions of data of a working copy, the portions of data of a restore backup of the working copy, and the storage regions containing those portions, after the creation of the restore backup, according to one embodiment.

FIG. 5 illustrates the portions of data of a restore backup, such as Restore Backup 105, and the storage regions containing those portions, after the creation of the restore backup. In general, restore backups contain data contained in portions of a working copy that are identified as differing from the corresponding portions of a logical data object contained in a backup.

A backup server, such as Server 101 of FIG. 1, can receive a request to restore a version of a logical data object from backup, such as Backup 103 of FIG. 4, to a working copy, such as 130 of FIG. 4. After such a request is received the backup server can create a restore backup, such as Restore Backup 105. As discussed below, data can be copied to the restore backup prior to the process of restoring a backup to a working copy, concurrently with the process of restoring a backup to a working copy, or after the process of restoring a backup to a working copy.

FIG. 5 illustrates that restore backups often store the differences between two versions of the same logical data object. As shown, Restore Backup 105 contains those portions of Logical Data Object 480 stored in Working Copy 130 of FIG. 4 that differ from the corresponding portions of Logical Data Object 290 stored in Backup 103 of FIG. 4. FIG. 5 shows that Portion 502 of Restore Backup 105 contains the same data as Portion 400 of Logical Data Object 480 of FIG. 4, which differs from the data stored in Portion 202(2) of Logical Data Object 290 of FIG. 4. As stated above, Logical Data Object 480 and Logical Data Object 290 are versions of the same logical data object.

However, restore backups can also contain portions of data that do not represent the difference between two versions of a logical data object. This situation may arise, for example, when the version of a logical data object stored on the backup contains more data than the current version of the logical data object stored on the working copy. For example, the current version of a file may be smaller than the version of that file stored on the backup. In this case, the excess data will be written to other storage regions of the working copy that do not currently store portions of the current version of the logical data object. The portions of the data stored in these other storage regions is unlikely to be the same as the portions of data stored in the backup, since the portions are not part of a version of the same logical data object. As such, the portions of data in these other storage regions can be copied to the restore backup, prior to being overwritten, as part of the restore process.

FIG. 5 illustrates only a single portion of data stored in Working Copy 130 of FIG. 4 being stored in Restore Backup 105. However, the restore backup can store as many portions of data stored on a working copy as differ from the corresponding portions of the version of the logical data object stored on a backup.

Restore backups can be any one of multiple kinds of backups. For example, a restore backup can be an incremental backup, containing only copies of portions of the working copy that differ from the version of the logical data object restored to the working copy. Alternatively, the restore backup can be a differential backup, containing a cumulative backup of all changes made to the working copy because of and subsequent to the restoration of the version of the logical data object restored to the working copy.

In one embodiment, the process of restoration copies, to a working copy, every portion of a first version of a logical data object stored on a backup that differs from a corresponding portion of data stored on the working copy. In some situations, the data stored on the working copy before the process of restoration is part of a second, different version of the logical data object copied from the backup. In these situations the process of restoring the first version of a logical data object from a backup transforms the second version of the logical data object into a copy of the first version of the logical data object. In other situations, all or some of the portions of data being overwritten may be unrelated to the logical data object. In these situations the process of restoring the first version of the logical data object from the backup transforms the unrelated portions into portions of a copy of the first version of the logical data object.

Part of the restoration process involves determining whether a portion of data in a region of the working volume is the same as the corresponding portion of data being copied from the backup to that region. This determination can be made by comparing the two portions. For example, each bit in the portion on the working copy can be compared to a corresponding bit from the backup (e.g., each bit in each portion can be compared to each other, beginning with the first bit).

Alternatively, this determination can be based on metadata associated with each portion. For example, assume an older version of a file is being restored from a backup, such that the restored version will overwrite at least some of the current version of the file. Metadata associated with each version of the file can identify the last time that version was modified. If the two versions were last modified at the same time, a determination can be made that the two versions are the same. Other metadata can also be used to make this determination. For example, a hash algorithm, such as MD5, could be used to generate a checksum for each portion. The checksums can then be compared to determine whether the portions are identical.

There are many ways to determine whether portions are identical and the present invention is not limited to a specific determination for each portion of the version of the logical data object stored on a backup. For example, an indication of only those portions that differ could be generated, thereby implying that all other portions are considered identical, or an indication of only those portions that are identical could be generated. In addition, the indications need only indicate that the corresponding portions are probably identical.

Figure 6:
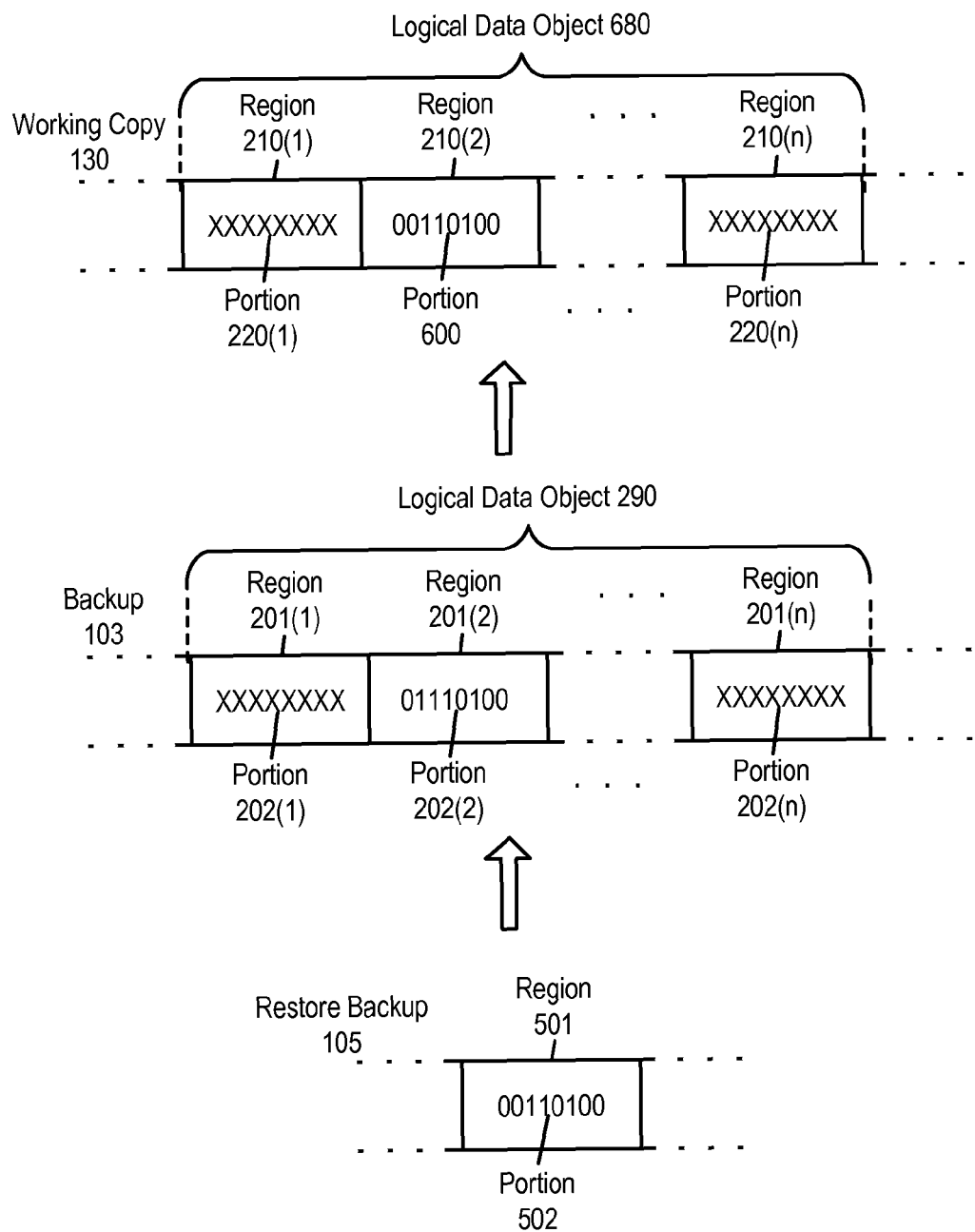
FIG. 6 is a block diagram illustrating the portions of data of a working copy, the portions of data of a backup of the working copy, the portions of data of a restore backup of the working copy, and the storage regions containing those portions, after the return of the working copy to a prior state of the working copy, according to one embodiment.

FIG. 6 illustrates the portions of data of a working copy, such as Working Copy 130, the portions of data of a backup of the working copy, such as Backup 103, the portions of data of a restore backup, such as Restore Backup 105, and the storage regions containing those portions, after the return of the working copy to a prior state of the working copy. FIG. 6 illustrates that portions of a restore backup together with portions of a backup can be used to return a working copy to a state of the working copy existing prior to the restoration of a logical data object to the working copy. FIG. 6 illustrates that in one embodiment this is accomplished by applying a restore backup, such as Restore Backup 105, to a backup, such as Backup 103, and then applying the backup to a working copy, such as Working Copy 130.

FIG. 4 shows Logical Data Object 480 of Working Copy 130 prior to the time that a request to restore Logical Data Object 290 of Backup 103 to Working Copy 130 was received and prior to the time that Portion 502 is stored in Restore Backup 105, as shown in FIG. 5. Some time after Portion 502 of FIG. 5 is stored in Restore Backup 105, the process of restoring Logical Data Object 290 to Working Copy 130 would be completed. Immediately after the completion of the restore process, Region 210(2) of Working Copy 130 contains a copy of the data stored in Portion 202(2) of Backup 103 since Portion 202(2) corresponds to Portion 400, which is stored in Region 210(2). As discussed above, the restore process copies portions of a version of a logical data object stored in a backup to the regions containing the corresponding portions of data stored in a working copy, whenever those portions are indicated as not being identical. Thus, immediately after the completion of the restore, Working Copy 130 will be in a state different from the state it was in prior to the time at which the request to restore was received. FIG. 6 shows that Working Copy 130 has been transformed by returning it to the state of Working Copy 130 shown in FIG. 4, which existed prior to the time at which the restore was performed.

FIG. 6 illustrates that Portion 502 of Restore Backup 105 was accessed to return Working Copy 130 to Working Copy 130's prior state by copying the data contained in Portion 502 to Region 201(2) of Backup 103 and then applying Backup 103 to Working Copy 130. By copying data in a restore backup to a backup and then applying the backup to a working copy, restore backups and backups can be used together to return working copies to the prior states of the working copies even if the working copies have been modified after the process of restoration and the creation of the restore backup.

FIGS. 2, 3, 4, 5, and 6 respectively illustrate a simplified example of the contents of a working copy, a backup, a restore backup, and a catalog. The contents and structure of working copies, backups, restore backups, and catalogs can differ from those shown.

Generation of the Restore Backup

Figure 7:
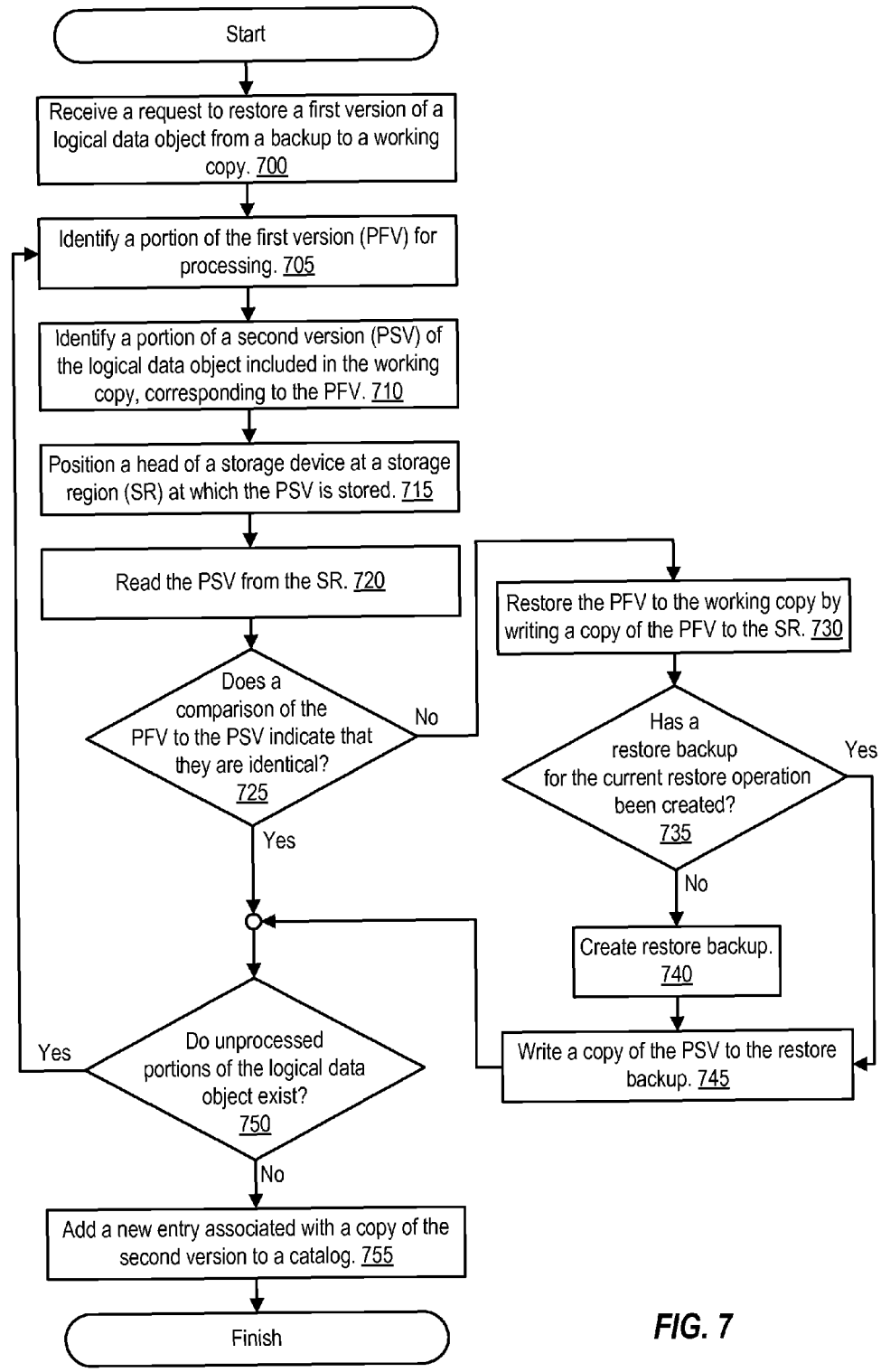
FIG. 7 is a flowchart of a procedure to restore a logical data object from a backup to a working copy, according to one embodiment.

FIG. 7 is a flowchart of a procedure to restore a logical data object from a backup to a working copy. In some embodiments, this procedure allows for the return of the working copy to a prior state of the working copy after the restore is performed. This procedure can be performed by a backup/restore system like that shown in FIG. 1 or any other suitable storage or restoration module.

The procedure of FIG. 7 begins with a system, such as Server 101 of FIG. 1, Client 110 of FIG. 1, or the server-client system of FIG. 1, receiving a request to restore a first version of a logical data object from a backup to a working copy, as shown at 700. The request may be received either from another system or from a user. The logical data object may be a logical data object such as Logical Data Object 290 of FIG. 4, the backup may be a backup such as Backup 103 of FIG. 1 or FIG. 4, and the working copy may be a working copy such as Working Copy 130 of FIG. 1 or FIG. 4. The backup can be stored on a storage device such as Storage Device 150 of FIG. 1, and the working copy can be stored on a storage device such as Storage Device 140 of FIG. 1.

According to one embodiment, the request to restore specifies the particular version of the logical data object to restore by specifying an entry of a catalog associated with the backup. This request can be generated by a user by a number of techniques, including the user selecting a version of a logical data object to restore from a list of versions of logical data objects identified in a catalog. The request can also be generated by an application. For example, an application can be configured to initiate the restoration of a version of a logical data object when specified criteria are met.

After a request to restore has been received, the system identifies a portion of the first version (PFV), such as Portion 210(2) of FIG. 4, for processing, as shown at 705. The system can identify a PFV for processing by accessing an algorithm that partitions the first version of the logical data object into portions in response to the request to restore. For example, an algorithm can divide the first version into as many portions of a given size as possible or it can divide the first version according to delimiters, such as carriage returns, included throughout the first version. Alternatively, the system can access a log or table that contains information identifying the portions in response to the request to restore. For example, the system can divide the first version into the clusters identified in a file allocation table. The system can also simply identify each bit of the first version as a PFV.

After identifying a PFV for processing, the system identifies a portion of a second version (PSV) of the logical data object, such as Portion 400, included in the working copy, corresponding to the PFV, as shown at 710. The system can identify a PSV for processing by accessing an algorithm that partitions the second version of the logical data object into portions corresponding to the portions of the first version, in response to the request to restore. For example, the algorithm can divide the second version into as many portions of a given size as possible, or the algorithm can identify a PSV for processing by accessing a log or table that contains information identifying the portions. Additionally, the system can simply identify the bits of the second version as the respective portions of the second version.

According to one embodiment, once the PFV and the PSV have been identified, the system will read the PSV, compare the PSV to the PFV to determine whether they are identical, and restore the PFV to the working copy. One way to reduce the amount of time required by these steps is to reduce the seek time of storage device heads. Thus, in one embodiment, a storage device head is positioned at a storage region in order to read the PSV and the head is not moved until after the PFV is restored to the working copy.

Therefore, the embodiment shown in FIG. 7 illustrates that after identifying the PFV and the PSV, the system positions a head of a storage device, such as Storage Device 140, at a storage region (SR) at which the PSV is stored, such as Storage Region 210(2), as shown at 715. After positioning the head at the SR, the PSV is read from the SR, as shown at 720.

After reading the PSV, the PSV is compared to the PFV to determine whether the PFV and PSV are not identical, as shown in 725. If the PFV and the PSV are determined to be identical, the procedure determines whether unprocessed portions of the logical data object exist, as shown at 750. If the PFV and the PSV are determined not to be identical, then the PFV is restored to the working copy by writing a copy of the PFV to the SR, as shown as 730.

After the PFV has been restored, a restore backup, such as Restore Backup 105 of FIG. 1, is created, if it has not already been created, as shown at 735 and 740. Next, a copy of the PSV, such as Portion 502 of FIG. 5, is written to the restore backup, as shown at 745. After the copy of the PSV is written, the procedure determines whether unprocessed portions of the logical data object exist, as shown at 750.

If no unprocessed portions of the logical data object are found to exist, then a new entry associated with a copy of the second version, which is now at least partially stored in the restore backup, is added to a catalog, as shown at 755. The catalog can be a catalog associated with the backup, such as Catalog 300, or it can be a catalog associated exclusively with the restore backup. Once all portions of the logical data object have been processed, the second version has been transformed into a version of the logical data object that is identical to the first version.

If unprocessed portions of the logical data object are found to exist, the procedure repeats itself beginning with the identification of another portion of the first version (PFV) for processing, as shown at 705.

Other embodiments could copy data to a restore backup of a working copy, by copying (sequentially or in parallel) portions of a version of the logical data object from the working copy to the restore backup, without following each of the steps of the procedure shown in the flowchart of FIG. 7 or without performing all the steps in the order shown in the flowchart of FIG. 7. For example, the comparison of a PFV to a PSV, as shown at 725 could be performed before or at the beginning of the procedure, or not at all, according to alternate embodiments.

According to one embodiment, the procedure includes accessing previously generated indications that a PFV and a PSV are not identical instead of comparing the PFV and the PSV. For example, the previously generated indications can be stored in log that is updated at regular intervals, or that is updated whenever a specified number of changes have been made to the working copy or to the second version of the logical data object. Alternatively, the previously generated indications are generated by comparison of a PSV to a PFV. As another example the previously generated indications are generated using metadata associated with first and second versions of the logical data object or using metadata associated with the working copy and the backup. Metadata includes any information concerning the logical data objects or the working copy or the backup, but is preferably information that reliably indicates that a PFV and a PSV are not identical.

In one embodiment, metadata associated with each PSV is compared with metadata associated with each PFV, instead of each PFV being compared to each PSV, as shown at 725. For example, if the PFV and the PSV are entire files, rather than portions of files, their file histories, such as their modification dates, can be compared to determine whether the files are likely to be identical or not, instead of comparing the files themselves.

As used herein, reference to a determination or an indication that two entities, such as a PFV and a PSV, are not identical includes reference to determinations or indications that logically imply or reasonably suggest that the two entities are not identical. For example, since an indication that all identical PFV-PSV pairs are noted in a particular list logically implies that any PFV-PSV pair not noted in the list are not identical, a reference to an indication that a PFV-PSV pair is not identical includes a reference to an indication that all identical PFV-PSV pairs are noted in a particular list. In other words, as used herein, a determination or an indication that two entities are not identical includes any determination or indication from which it can be inferred that the two entities are not identical.

FIG. 7 shows at 745 that a copy of an identified PSV is written to a restore backup after the PFV is restored to the working copy. Alternatively, a copy of an identified PSV can be written to a restore backup immediately after the PSV is read from the SR, as shown at 720, and before the PFV is restored to the working copy, as shown at 730. A copy of the PSV can be written at any time after it is read from the SR. In one embodiment, a copy of the PSV is stored in a buffer or log to be written to the restore backup after no unprocessed portions of the logical data object remain.

In one embodiment, the determination that a restore backup has been created and the creation of the restore backup, are performed immediately after the request to restore has been received, rather than after the PFV is restored to the working copy, as shown at 735 and 740. The determination and creation can be performed at any time before a copy of a PSV is to be written to it.

FIG. 7 illustrates an embodiment in which data is copied to a restore backup as part of, and concurrently with, the process of the restoration of the first version to a working copy. However, all portions of a second version that differ from the corresponding portions of a first version can be copied to a restore backup before the process of restoration commences. In addition, all portions of a second version that differ from the corresponding portions of second version can be buffered such that they are copied to a restore backup after the completion of the process of restoration. Thus, data can be copied to the restore backup prior to the process of restoration, concurrently with the process of restoration, or after the process of restoration.

FIG. 7 illustrates the case in which distinct actions or distinct sets of actions perform the identification of a PSV corresponding to the PFV, as shown at 710, the positioning of the head of a storage device at an SR, as shown at 715, and the reading of the PSV from the SR, as shown at 720. However, each of these can be performed as a result of the same action or set of actions. For example, a PSV can be identified by being read from the SR.

While the above discussion of the procedure illustrated in FIG. 7 concerns procedures involving a portion of a second version (PSV) of a logical data object included in a working copy, other embodiments can perform procedures substantially similar to the procedures discussed above except that the other embodiments substitute a portion of data (POD) included in a working copy for the PSV. This occurs, for example, in embodiments in which there is no second version of a logical data object contained in the working copy.

Figure 8:
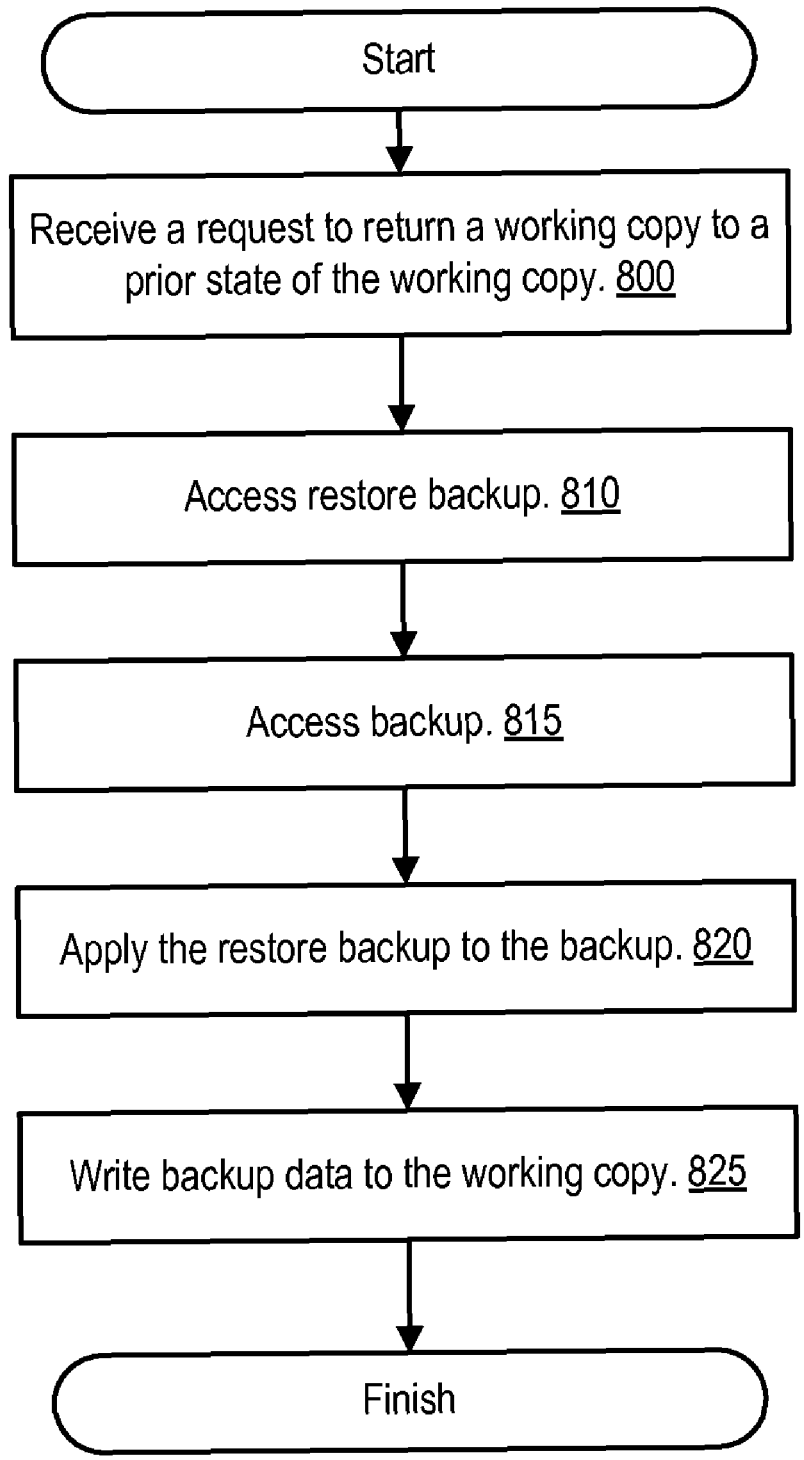
FIG. 8 is a flowchart of a procedure to return a working copy to a prior state of the working copy by accessing a restore backup, according to one embodiment.

FIG. 8 is a flowchart of a procedure to return a working copy to a prior state of the working copy, such as Working Copy 130 of FIG. 6, by accessing a restore backup, such as Restore Backup 105 of FIG. 6, according to one embodiment. This procedure can be performed by a system like that shown in FIG. 1 or any other suitable storage or restoration module.

The procedure of FIG. 8 begins by a system, such as Server 101 of FIG. 1, Client 110 of FIG. 1, or the server-client system of FIG. 1, receiving a request to return a working copy to a prior state of the working copy, as shown at 800. The working copy is a working copy for which a restore backup has been created. The request can be received from either another system or from a user. The working copy can be stored on a storage device such as Storage Device 140 of FIG. 1. A user can generate this request by a number of procedures. For example, the user can select a version of a logical data object to return to the working copy from a list of logical data objects identified in a catalog, such as Catalog 300 of FIG. 3. The catalog can be associated with a backup, such as Backup 103 of FIG. 6, as well as with a restore backup, such as Restore Backup 105 of FIG. 6. Alternatively, the catalog can be associated with a restore backup alone. The request can also be generated by an application. For example, an application configured to initiate the return of a logical data object can initiate a request to return that logical data object, when specified criteria are met.

After receiving the request to return, the procedure accesses the appropriate restore backup, such as the restore backup associated with a catalog accessed by a user, as shown at 810. After the restore backup is accessed for any required portions of data, an appropriate backup, such as a backup associated with the catalog accessed by the user, is accessed, as shown at 815. After the backup is accessed, or as part of the act of accessing the backup, the required portions of data obtained from the restore backup are written, i.e. applied, to the backup, as shown at 820. After the portions of data obtained from the restore backup are written to the backup, the data in the backup is written, i.e. applied, to the working copy, as shown at 825.

Since, as stated above, the restore backup can be one of any number of different types of backups, the process shown in FIG. 8 can involve additional actions as needed, in order to accommodate each of the different types. For example, if the restore backup is an incremental backup, additional incremental backups may need to be accessed and applied to the backup before writing the data in the backup to the working copy. Alternatively, if the restore backup is an incremental backup, the backup, the restore backup and any incremental backups could be applied in chronological order to the working copy. However, if the restore backup is a differential backup, only the restore backup, in addition to the backup, may need to be accessed.

According to one embodiment, applying the restore backup to the backup comprises writing portions of data obtained from the restore backup, such as Portion 502 of FIG.

6, to regions storing corresponding portions of the backup, such as Region 201(2) of FIG. 6. Additionally, applying the backup to the working copy comprises writing portions of the data obtained from the backup, such as Portions 202(1) and 202(n) as well as the portion now stored in Region 201(2) of FIG. 6, to storage regions of the working copy that previously contained copies of the data contained in those portions, such as Regions 210(1) and 210(n) as well as Region 210(2) of FIG. 6, respectively.

Alternative embodiments can rely upon the fact that the differences between the versions of the logical data objects stored in a working copy after a restore operation and the versions of the logical data objects, or collections of data, stored in a prior state of the working copy are each contained in a restore backup, as illustrated in FIG. 5. This situation may arise, for example, when no changes have been made to a working between the time that a logical data object has been restored to the working copy and a request has been received to return the working copy to its prior state. Therefore, in order to return the working copy to a prior state of the working copy embodiments need only access the restore backup and return the differences contained in the restore backup to the logical data objects of the working copy. This returns the versions of the logical data objects, or collections of data, previously stored in the working copy to the working copy.

Figure 9:
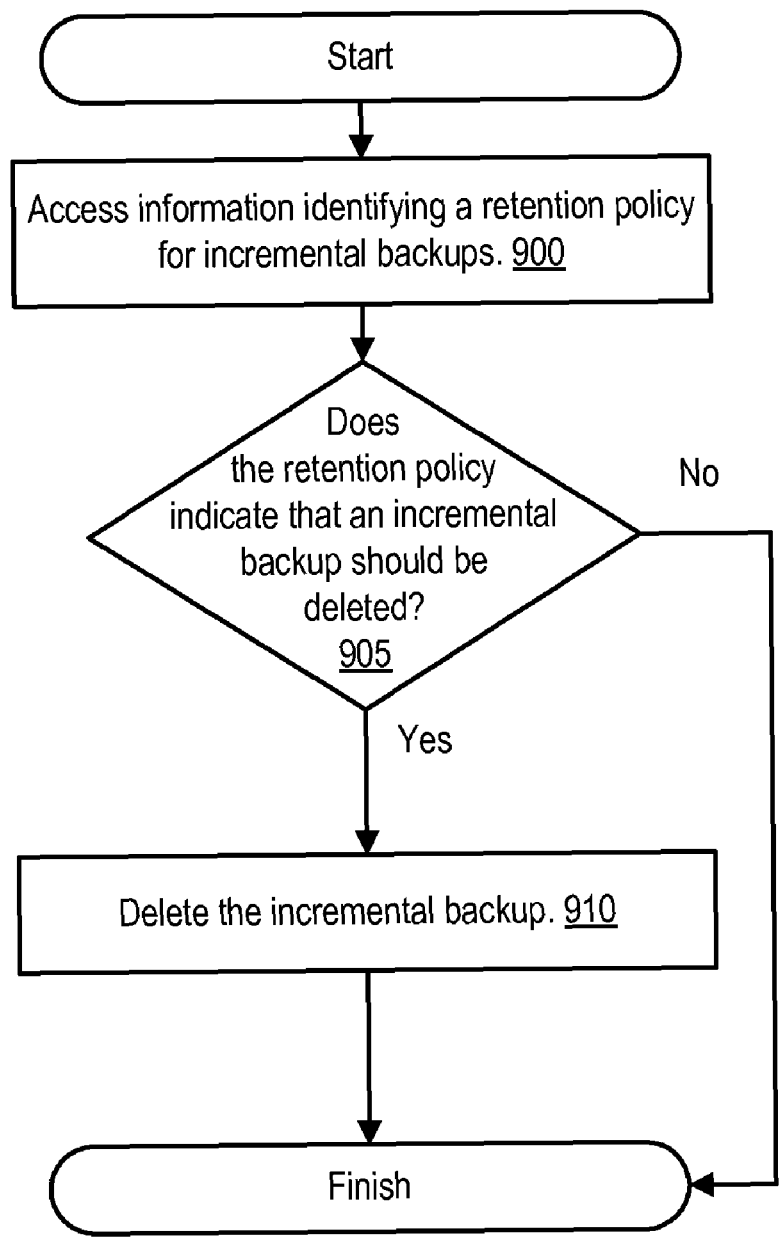
FIG. 9 is a flowchart of a procedure to maintain a restore backup in accordance with a retention policy, according to one embodiment.

FIG. 9 is a flowchart of a procedure to maintain a restore backup, such as Restore Backup 105 of FIGS. 1, 5, and 6, in accordance with a retention policy, according to one embodiment. The procedure begins when information identifying a retention policy for restore backups is accessed, as shown at 900. After the information identifying the retention policy has been accessed, the procedure determines whether the policy indicates that a restore backup should be deleted, as shown at 905. If the retention policy indicates that the restore backup should be deleted, the restore backup is deleted, as shown at 910.

Various embodiments can access retention policies including a variety of combinations of a variety of rules for maintaining and deleting restore backups. For example, retention policies can determine retention based on the length of time passed since a restore backup was originally created, based on the length of time since a restore backup was last accessed, or based on the number of restore backups currently being stored, and retention policies can be configured to apply different rules, or sets of rules, to different types of files and to different storage resource types (e.g. databases vs. flat files, and tape storage vs. hard-drive storage).

Software Implementation

Figure 10:
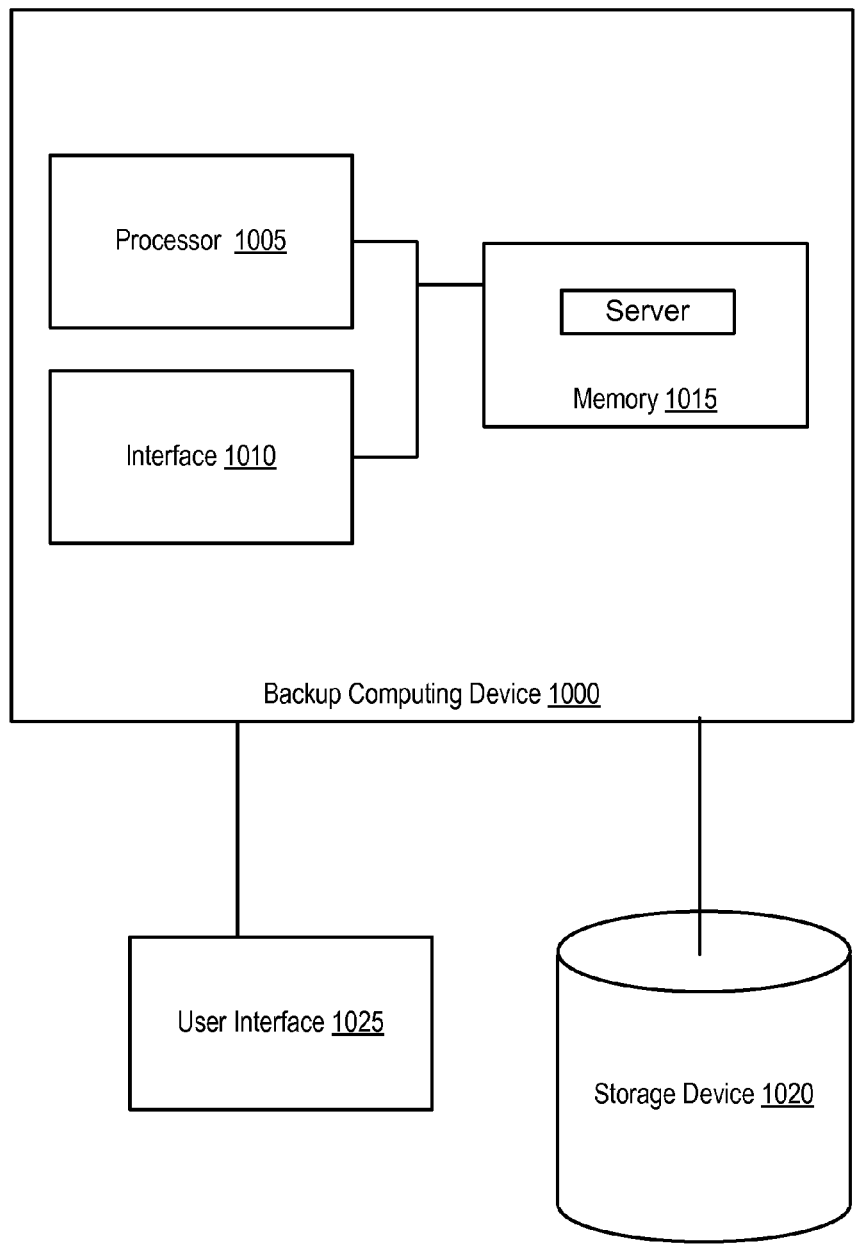
FIG. 10 is a block diagram of a computing device that can implement either or both of a backup server and a backup/restore client that can either together or alone backup a working copy of data, restore a logical data object to the working copy from the backup, create a restore backup, and return the working copy of data to a prior state of the working copy, according to one embodiment.

FIG. 10 illustrates how certain elements of a Server 101 or Client 110 or other computer system can be implemented in software. FIG. 10 is a block diagram of a Backup Computing Device 1000 that can implement either or both of a backup server and a backup/restore client. The backup server and the backup/restore client can, either together or alone, backup a working copy of data, restore a logical data object to the working copy from the backup, create a restore backup, and return the working copy of data to a prior state of the working copy. As illustrated, Backup Computing Device 1000 includes at least one processor, Processor 1005 (e.g., microprocessors, PLDs (Programmable Logic Devices), or ASICs (Application Specific Integrated Circuits)) configured to execute program instructions stored in Memory 1015. Memory 1015 can include various types of RAM (Random Access Memory), ROM (Read Only Memory), Flash memory, MEMS (Micro Electro-Mechanical Systems) memory, magnetic core memory, and the like. Memory 1015 can include both volatile and non-volatile memory. FIG. 10 shows Memory 1015 storing instructions for implementing a backup server. In addition, Memory 1015 can store instructions for a backup/restore client or instructions for any other backup and restore module. Backup Computing device 1000 also includes at least one user interface, shown as User Interface 1025. User Interface 1025 can be any device or combination of devices allowing the user to input data or responses to Backup Computing Device 1000, such as a keyboard, a mouse, and/or a monitor. Backup Computing Device 1000 also includes at least one interface, Interface 1010. Processor 1005, Interface 1010, and Memory 1015 are coupled to send and receive data and control signals by a bus or other interconnect.

Interface 1010 can include a network interface to various networks (e.g., such as network 120 of FIG. 1) and/or interfaces to various peripheral buses. Interface 1010 can also include an interface to one or more storage devices (e.g., Storage Devices 140 and 150 of FIG. 1). Interface 1010 can, for example, be used to access information stored on Storage Devices 140 and 150, such as Working Copy 130, Backup 103, Restore Backup 105, and portions thereof, and to write information to Storage Devices 140 and 150. Interface 1010 can also be used, for example, to send control signals to storage devices, such as Storage Device 150 and Storage Device 140, in order to cause the read-and-write heads of those devices to move to a specified storage region.

In this example, program instructions and data executable to implement all or part of certain system functionality, such as creating a backup of a working copy, identifying portions of versions of a logical data object, comparing corresponding portions, writing copies of portions to a restore backup, and restoring copies of portions to a working copy, are stored in Memory 1015. In addition, the program instructions and data executable to implement all or part of certain system functionality can be stored on various other computer readable storage media. In some embodiments, such software is stored on a computer readable storage medium such as a CD (Compact Disk), DVD (Digital Versatile Disc), hard disks, optical disk, tape device, floppy disk, and the like. In order to be executed by Processor 1005, the instructions and data implementing all or part of the system functionality can be loaded into Memory 1015 from the other computer readable storage medium. The instructions and/or data implementing all or part of the system functionality can also be transferred to Backup Computing Device 1000 for storage in Memory 1015 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a request to restore a first version of a logical data object from a backup to a working copy; and
in response to the request, copying a portion of data from the working copy to a restore backup, based on an indication that the portion of data is not identical to a corresponding portion of the first version, wherein
the restore backup is not the backup,
the copying is performed by a backup computing device, and
the backup computing device comprises a processor.

2. The method of claim 1, further comprising
restoring the portion of the first version to the working copy from the backup,
wherein the copying comprises reading the portion of the data, and
wherein the restoring is performed subsequent to the reading.

3. The method of claim 2, further comprising
returning the working copy to a prior state of the working copy,
wherein the prior state existed prior to the restoring, and
wherein the returning comprises accessing the restore backup.

4. The method of claim 2, further comprising:
accessing information identifying a retention policy for restore backups; and
deleting the restore backup in response to the retention policy.

5. The method of claim 2,
wherein the portion of the first version is a first bit,
wherein the portion of the data is a second bit, and
the method further comprises generating the indication based on a comparison of the first bit to the second bit.

6. The method of claim 5,
wherein the reading is performed with a storage device head at a location of a storage device, and
wherein the restoring comprises writing the first bit to the working copy subsequent to the reading but before any movement of the storage device head from the location.

7. The method of claim 6,
wherein a catalog is associated with the backup,
wherein an entry in the catalog is associated with the first version of the logical data object, and
wherein the request to restore specifies the entry.

8. The method of claim 7, further comprising
adding a new entry to the catalog, subsequent to the copying,
wherein the new entry is associated with a copy of the data, and
wherein the data is partially stored in the restore backup.

9. The method of claim 2,
wherein the indication comprises metadata associated with the logical data object.

10. The method of claim 1, wherein the data is a second version of the logical data object.

11. A non-transitory computer readable storage medium comprising:
program instructions executable by one or more processors to
receive a request to restore a first version of a logical data object from a backup to a working copy; and
in response to the request, copy a portion of data from the working copy to a restore backup, based on an indication that the portion of data is not identical to a corresponding portion of the first version,
wherein
the restore backup is not the backup.

12. The non-transitory computer readable storage medium of claim 11, further comprising:
program instructions executable by one or more processors to
restore the portion of the first version to the working copy from the backup,
wherein the copying comprises reading the portion of the data, and
wherein the restoring is performed subsequent to the reading.

13. The non-transitory computer readable storage medium of claim 12, further comprising:
program instructions executable by one or more processors to
return the working copy to a prior state of the working copy,
wherein the prior state existed prior to the restoring, and
wherein the returning comprises accessing the restore backup.

14. The non-transitory computer readable storage medium of claim 12,
wherein the portion of the first version is a first bit,
wherein the portion of the data is a second bit, and
the computer readable storage medium further comprises instructions executable by one or more processors to generate the indication based on a comparison of the first bit to the second bit.

15. The non-transitory computer readable storage medium of claim 14,
wherein the reading is performed with a storage device head at a location of a storage device, and
wherein the restoring comprises writing the first bit to the working copy subsequent to the reading but before any movement of the storage device head from the location.

16. A system comprising:
a memory; and
one or more processors coupled to the memory, wherein the one or more processors are configured to:
receive a request to restore a first version of a logical data object from a backup to a working copy; and
in response to the request, copy a portion of data from the working copy to a restore backup, based on an indication that the portion of data is not identical to a corresponding portion of the first version,
wherein
the restore backup is not the backup.

17. The system of claim 16, wherein the one or more processors are further configured to:
restore the portion of the first version to the working copy from the backup,
wherein the copying comprises reading the portion of the data, and
wherein the restoring is performed subsequent to the reading.

18. The system of claim 17, wherein the one or more processors are further configured to:
return the working copy to a prior state of the working copy,
wherein the prior state existed prior to the restoring, and
wherein the returning comprises accessing the restore backup.

19. The system of claim 17,
wherein the portion of the first version is a first bit,
wherein the portion of the data is a second bit, and
the computer readable storage medium further comprises instructions executable by one or more processors to generate the indication based on a comparison of the first bit to the second bit.

20. The system of claim 19,
wherein the reading is performed with a storage device head at a location of a storage device, and
wherein the restoring comprises writing the first bit to the working copy subsequent to the reading but before any movement of the storage device head from the location.

* * * * *